United States Patent [19]

Pekker

[11] 4,449,126

[45] May 15, 1984

[54] ELECTRONIC LOCK DEVICE AND OPTICAL KEY THEREFOR

[76] Inventor: Valery Pekker, 7 Squire La., Pittsford, N.Y. 14534

[21] Appl. No.: 326,533

[22] Filed: Dec. 2, 1981

[51] Int. Cl.³ .......................... E05B 47/00; H04Q 3/00

[52] U.S. Cl. .................................. 340/825.32; 70/382

[58] Field of Search ...................... 340/825.31, 825.32; 70/383, 382, DIG. 51

[56] References Cited

U.S. PATENT DOCUMENTS 4,090,175 5/1978 Hart ............................... 340/825.32

4,392,134 7/1983 Lutz .............................. 340/825.31

FOREIGN PATENT DOCUMENTS 2807080 8/1979 Fed. Rep. of Germany ........................ 340/825.31

*Primary Examiner*—Donald J. Yusko

*Attorney, Agent, or Firm*—Shlesinger, Fitzsimmons & Shlesinger

[57] ABSTRACT

This device comprises a housing having a circular keyway, and a key having a cylindrical light-transmissive shank insertable into the keyway to energize a lamp, which directs light longitudinally along the shank and radially outwardly through a plurality of openings in the annular wall of the shank and onto a plurality of light pipes which are secured in openings formed in the key housing to open on the keyway at axially and angularly spaced points therealong. The opposite ends of the light pipes confront upon light-sensitive elements which form part of an electrical control circuit that produces an output which unlocks the device, when all of the light sensitive elements are energized, but which energizes an alarm if less or more than all of the light sensitive elements are energized. In a second embodiment an electro-mechanical device can be employed for securing the key housing against rotation whereupon a switch is closed to energize a circuit which releases the key housing for rotation to a position in which it energizes the lamp.

5 Claims, 10 Drawing Figures

ELECTRONIC LOCK DEVICE AND OPTICAL KEY THEREFOR

BACKGROUND OF THE INVENTION

This invention relates to locking devices, and more particularly to an improved electronic locking device that is operated by a novel, light-transmissive key. Even more specifically this invention relates to an electronic locking device having light-sensitive elements connected by light pipes with openings on a keyway in the device, and which are controlled by a key having a light transmissive shank coded to transmit light to predetermined spots in the keyway.

There are a number of known locking devices, the operations of which embody a combination of optical and electronic technology. Frequently these devices are controlled by a key, which embodies a code that is read out, or sensed, when the key is inserted into an appropriate keyway device. Typically, however, the shanks of such keys must be carefully machined or shaped to form thereon the usual notches and teeth which are designed to operate the associated tumblers or special circuit operating elements. In other cases prior electronic locking devices have required rather complicated or expensive circuitry to perform the desired locking function.

U.S. Pat. No. 4,090,175, for example, teaches an opto-electronic locking device operated by a perfectly flat, plane key having intermediate its ends a plurality of spaced holes or apertures, and having formed on its inner end a plurality of spaced projections, which are adapted mechanically to operate plungers when the key is inserted into a slit or keyway in the associated key cylinder. A plurality of spaced light pipes are located at one side of the cylinder to direct beams of light onto one side of the key shank. Only when the openings in the shank are properly aligned with these beams will they pass through the shank and onto spaced, light-responsive elements located at the opposite side of the cylinder, thereby completing a circuit necessary for operation of the locking device.

The obvious disadvantage of this type of device is that there are only so many locations on the shank of the key through which openings can be made in order to provide an optical code different for each different locking device. Moreover, each key shank must be drilled or otherwise provided with a plurality of openings which are located (at least with respect to one opening) differently from those openings made in the shank of other keys.

U.S. Pat. No. 3,733,862 also discloses a combined mechanical and photoelectric lock; but again, identifying data or coding circuits are energized by virtue of light which is directed transversely through openings in the flat shank of an otherwise conventionally shaped key. Likewise, U.S. Pat. No. 3,639,906 utilizes combination opto-electronic device, but again the operating key is of conventional configuration.

U.S. Pat. No. 3,786,471 and No. 3,029,345 also disclose electronic locking systems, but each uses perfectly flat keys which are perforated or notched along their edges to provide the necessary coding.

U.S. Pat. Nos. 3,500,326; 3,599,454; and 3,889,501 also disclose, in essence, generally conventionally shaped keys for operating electronic locking devices.

SUMMARY OF THE INVENTION

It is an object of this invention, therefore, to provide a novel electronic locking device operated by a light transmissive key the shape of which is such that the key can be encoded to operate a significantly greater number of different locking devices, as compared to prior electronic locking devices. In its preferred form this invention comprises a key cylinder or housing having a generally cylindrical bore or keyway, and a plurality of light pipes which open at one end on the keyway at closely spaced points thereabout, and which at their opposite ends open on a plurality of light-sensitive elements that form part of an electronic control circuit for the device. The key for operating this device has a tubular shank containing a lesser plurality of radial openings which are disposed to register with a predetermined set of the light pipes where they open on the keyway. When the shank is properly inserted into the bore of the key cylinder its inner end closes a switch and energize a lamp that directs light into the bore in the key shank. This light is transmitted through the radial openings in the shank, and onto the confronting ends of the set of light pipes associated with that particular key. These pipes in turn transmit the light as a plurality of separate beams onto an associated set of light-sensitive elements in the control circuit.

The control circuit includes a plurality of photoelectric cells the outputs of which are connected to an electronic memory. If the signals, as represented by the light beams transmitted through the light pipes, energize the proper set of photocells for a given locking device, the memory causes the associated locking device to open. On the other hand, if an incorrect series of light beams are directed through the light pipes then the control circuit triggers an alarm or the like.

THE DRAWINGS

In the drawings:

FIG. 1 is a fragmentary view of the associated key cylinder and key employed in this novel locking device, portions of the cylinder and key being broken away and shown in section for purposes of illustration;

FIGS. 2, 3, 4 and 5 are sectional views taken, respectively, generally along the lines 2—2, 3—3, 4—4, and 5—5 in FIG. 1, looking in the direction of the arrows;

Figure 7:
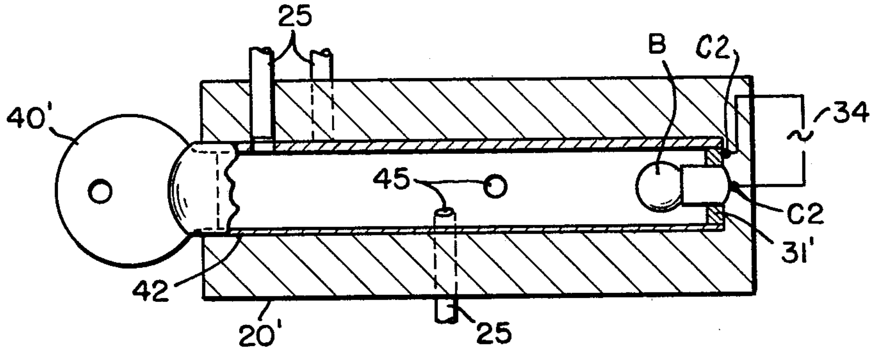
FIG. 7 is a view similar to FIG. 1, but showing in cross section a modified type of key cylinder which can be employed for this invention.
Figure 8:
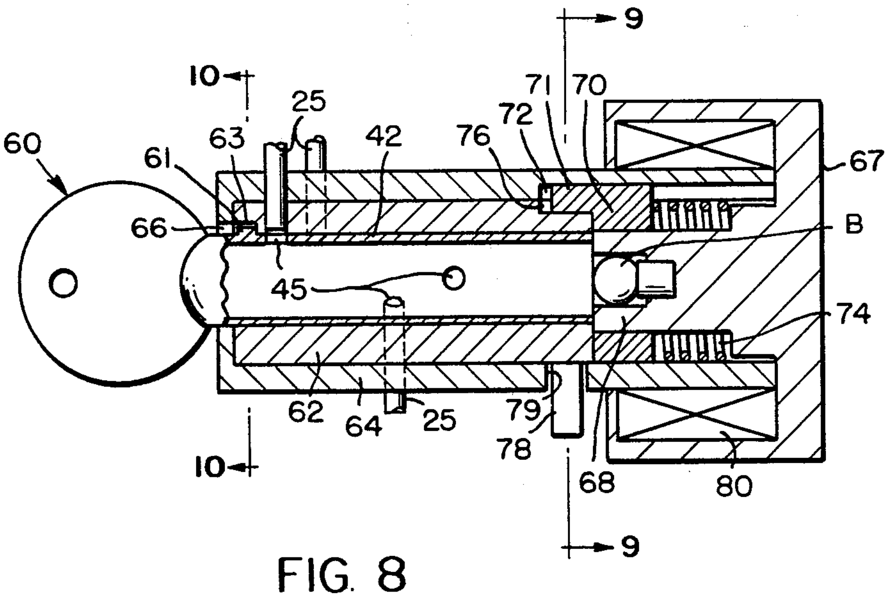
Figure 9:
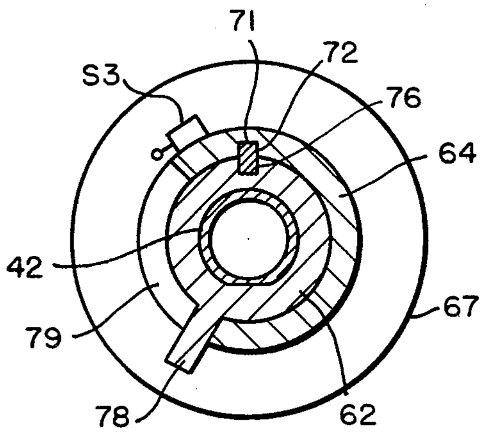
Figure 10:
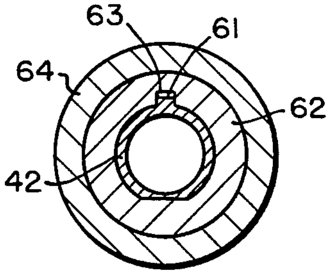

FIG. 8 is a fragmentary sectional view similar to FIG. 7, but showing still another modification of this key cylinder and associated key; and FIGS. 9 and 10 are cross sectional views taken, respectively, along the lines 9—9 and 10—10 in FIG. 8 looking in the direction of the arrows.

DETAILED DESCRIPTION OF THE PREFERRED EMBODIMENT OF THE INVENTION

Referring now to the drawings by numerals of reference, and first to FIGS. 1-5, 20 denotes an elongate key cylinder or housing having therein an axial or central bore 21 which extends from one end of the housing (the left end in FIG. 1) part way toward the other end thereof. Bore 21 is substantially circular in cross section, except that it is provided with an elongate chordal flat 22, which extends the length of the keyway along its lower side as shown in FIGS. 1–5. Secured in a plurality of closely spaced radial openings 24 formed in housing 20 to surround its bore 21 is a like plurality of light pipes 25 only certain of which are shown in the drawings for purposes of illustration. Each pipe 25 opens or faces at its inner end upon keyway 21, and at its opposite end is connected to a control circuit in a manner which is described in greater detail hereinafter.

Figure 1:
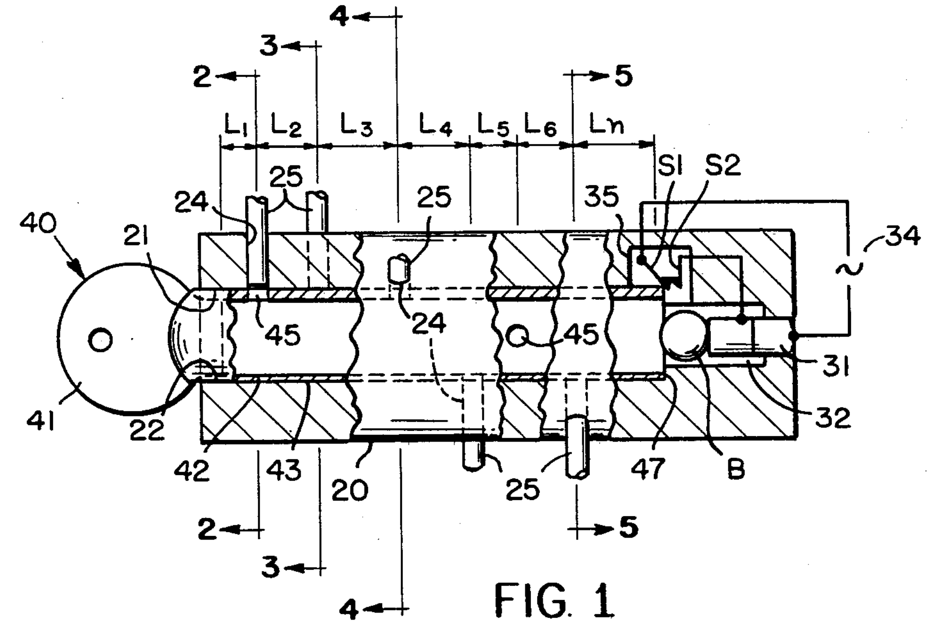
Figure 2:
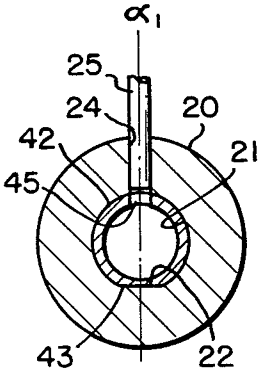
Figure 3:
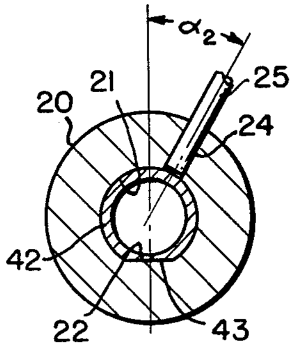
Figure 4:
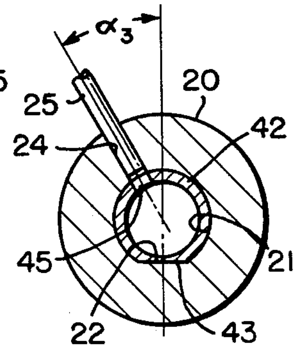
Figure 5:
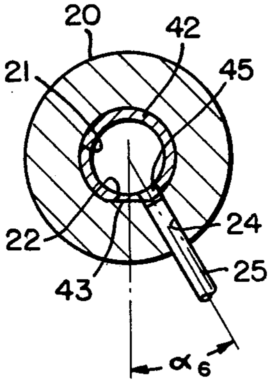

Releasably secured in a conventional lamp socket 31, which is secured in the closed end of housing 20 (its right end as shown in FIG. 1), is a lamp bulb B. This bulb extends into a central recess 32, which is formed in the closed end of housing 20 coaxially of its bore 21. As shown diagramatically in FIG. 1, the lamp socket 31 is connected, when in use, through a pair of switch contacts S1 and S2 with an electrical power supply, such as for example the alternating current power supply denoted at 34 in FIG. 1. In the embodiment illustrated, the switch contact S1 is a normally-open contact which is mounted in a recess 35 formed in the keyway or bore wall 21 adjacent its inner end.

Numeral 40 denotes generally a novel key which is designed to control the locking circuit of this invention. Key 40 has a conventionally shaped head 41, and an integral, tubular shank or stem portion 42, which is generally circular in cross section. Key shank 42 has an outside diameter slightly less than the inside diameter of the keyway 21, and has on its outer peripheral surface a longitudinally extending chordal flat 43, which is disposed to have coplanar sliding engagement with the mating keyway flat 22, when the key is operatively positioned in the housing as shown in FIG. 1. Intermediate its ends shank 42 has therein a plurality of spaced, circular openings 45, each of which is disposed to register with the inner end of one of the light pipes 25, when the key is properly designed and seated in the keyway 21. Also at such time its flat 43 will be disposed in coplanar relation with the flat 22 on the keyway 21; and its inner end will be seated against a shoulder 47 (FIG. 1), which is formed at the bottom of keyway 21 outside of the recess 32. Moreover, also as shown in FIG. 1, the inner end of the fully seated key 40 will engage and close the normally-open contact S1 against the other contact S2, thereby causing the bulb B to be energized and to direct light into the bore in the tubular shank 42 of the key. This light passes through each of the radial openings 45 (five in the embodiment shown); and assuming that the corresponding light pipes (five of six shown in FIG. 1) are in proper registry with openings 45 in the shank, light is transmitted through each of these light pipes 25 to a control circuit of the type shown, merely by way of example, in FIG. 6.

Figure 6:
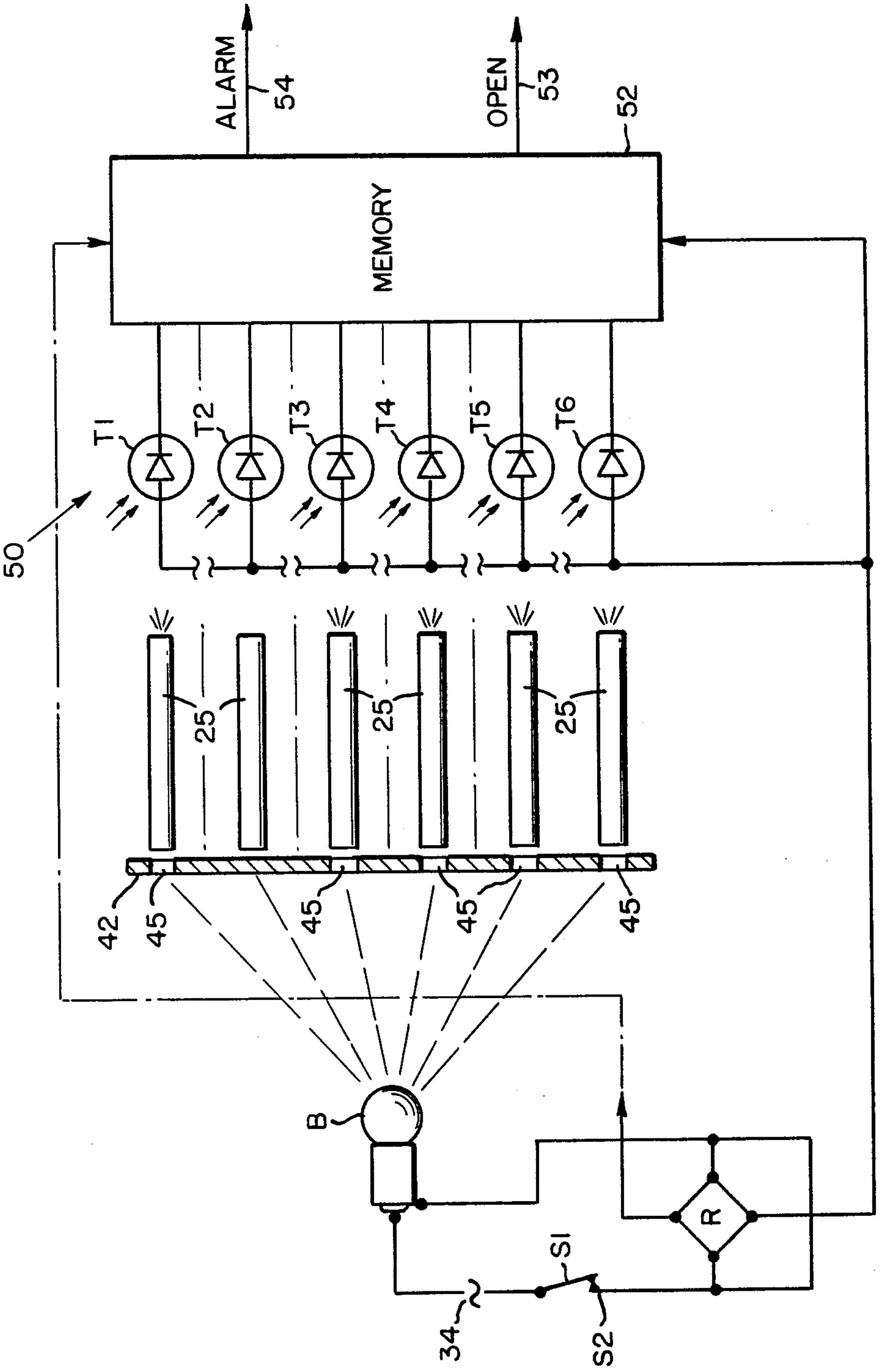
FIG. 6 is a schematic wiring diagram showing one manner in which the control circuit for this wiring device can be operated selectively to open the locking device or to trigger an alarm.

Referring now to FIG. 6, wherein like numerals are employed to denote elements similar to those shown in FIGS. 1–5, the closing of switch contact S1 not only energizes the bulb B, but also provides power for a rectifier R, the output of which is supplied to a control circuit denoted generally by the numeral 50. This circuit includes a large number of light-sensitive electronic elements, which by way of example, in the illustrated embodiment comprise a plurality of different photoelectric cells only certain of which are illustrated and denoted at T1, T2, T3, T4, T5 and T6, respectively. The outputs of these cells are connected to a memory which is denoted generally at 52 in FIG. 6.

Each of the light-sensitive elements is positioned on a circuit board, or the like, to register with one end of one of the light pipes 25, the opposite ends of which are secured, as noted above, in housing 20 to open on its bore 21. Consequently, whenever the bulb B is energized to supply light to the openings 45 in a particular key shank, light will be transmitted only through those light pipes 25 which register with openings 45 in the shank, and therefore only the corresponding photocells will be energized and apply a logic 1, for example, to the input of memory 52, while the remaining photocells, such as those associated with the light pipes of the type shown in FIG. 3 (i.e., not in registry with an opening 45) will have logic zero outputs. If the correct set of photocells is energized, then memory 52 produces at its output 53 a signal (or signals) which open the locking device by virtue of any conventional means, such as for example by energizing a solenoid, or the like, to withdraw a bolt from a cooperating housing bore. This simplified description of the opening of the locking device is submitted merely by way of example. The memory output as represented by line 53 in FIG. 6 could be utilized to open any one of a variety of different types of locking devices, on buildings, vaults, or the like, including any application requiring security and an electrical interlock for safety and/or warning purposes.

The same memory 52 can also be employed to energize an audible or visual alarm (or both) of any conventional form in the event that the particular set of photocells energized does not coincide with the set for which the memory has been programmed. In such case, instead of producing an output on line 53, the memory 52 will produce an output on line 54, which is connected to a signal-responsive alarm which will be energized and provide a warning that the wrong type of key 40 has been inserted in the keyway 21.

Referring now to FIG. 7, wherein like numerals are employed to denote elements similar to those employed in the first embodiment, 20' denotes a modified key housing disposed to receive the tubular shank 42 of a modified key 40'. This device is similar to that shown in FIG. 1 except that the bulb socket 31' is secured in the inner end (the right end) of the bore in the tubular key shank 42 releasably to support bulb B centrally in the inner end of shank 42. When the shank 42 of key 40' is inserted into housing 20', a projecting portion of the socket 31' engages a contact C1, which is secured in the closed end of the housing, and at the same time that the terminal on the tip of the bulb shank engages a second contact C2, which is also fixed in housing 20' adjacent contact C1. With the socket 31' and bulb B thus engaged with contacts C1 and C2, a circuit is closed to supply the power, for example, from the AC power supply 34, for energizing bulb B. Light from bulb B is then transmitted through the bore in the shank of key 40' to the associated shank openings 45, which, as in the case of the embodiment shown in FIG. 1, will then cause the associated light pipes 25 to energize the control circuit.

In the modification of the device as shown in FIGS. 8–10, and where like numerals are again employed to denoted elements similar to those described in connection with the preceeding embodiments, 60 denotes generally a modified key having the usual tubular shank 42 containing the radial apertures or openings 45 for registry with light pipes 25 mounted in the surrounding key cylinder 62. In this embodiment the key cylinder or housing 62 differs from housings 20 and 20' in that it is mounted coaxially in the bore of a tubular casing 64, one end of which (the right end in FIG. 8) extends coaxially into the bore of an annular solenoid coil 66, which is mounted in stationary housing 67. Housing 67 has an integral, reduced-diameter core or stem 68, which projects coaxially into the bore in casing 64 to engage the inner or right end of the key cylinder 62.

Mounted for axial sliding movement on the core 68 in the annular space between the core and the surrounding casing 64 is an annular lock washer 70, which has on its outer peripheral surface an elongate, axially extending land or lug 71, which is slidable adjacent its outer edge in an axial groove 72 formed in the bore of casing 64 to extend party way inwardly from the right end thereof as shown in FIG. 8. A compression spring 74 surrounds the housing core 68 rearwardly or to the right of washer 70, and urges the washer resiliently toward the left in FIG. 8, so that the washer normally is seated against the inner end of the cylinder 62. In this position the lug 71 on washer 70 extends at one end into the groove 72 in casing 64, and into a mating groove or notch 76 that is formed in the outer peripheral surface of the key cylinder 62. In this position the lug 71 prevents any relative rotation between cylinder 62 and the surrounding casing 64.

Mounted in a recess in the inner end of the housing core 68 is an electric lamp bulb B, which is disposed to be connected to a power supply in a manner described hereinafter.

Adjacent its outer or left end as shown in FIG. 8 key 60 has on its outer peripheral surface a small, rectangular projection or lug 61, which is disposed to seat in a complimentary notch formed in the adjacent end of cylinder 62. The left (FIG. 8) or outer end of casing 64 is closed except for a circular opening which is notched as by slot 66 to permit the insertion of the key shank 42 coaxially into the bore in cylinder 62, provided that the lug 61 on shank 42 is placed in registry with recesses 66 and 63.

As in the case of the first embodiment, when the shank 42 of key 60 is fully seated in the keyway or bore of the locking cylinder 62, the inner end of the shank engages and closes a switch (not illustrated), which in this embodiment is connected in series with coil 66 and the AC power supply, and which therefore energizes the solenoid coil 66. This in turn causes the locking ring 70 to be drawn toward the right in FIG. 8 against the resistance of spring 74, and far enough to move its lug 71 from the groove 76 in the inner end of cylinder 62. This permits cylinder 62 to be rotated by key 60 relative to the surrounding casing 64, by virtue of the engagement of key lug 61 in the cylinder notch 63. Adjacent its inner or right end cylinder 62 carries a radially projecting pin 78, which extends through an arcuate slot 79 in casing 64 adjacent the solenoid housing 67. Consequently, as the key 60 and cylinder 62 rotate, the pin 78 is swung in slot 79 into any angular position desired, within the limits allowed by the arcuate extent of slot 79.

As soon as the key 60 is swung or rotated (for example clockwise in FIG. 9) out of its position as shown in FIGS. 8 and 9, the notch 76 in the inner end of cylinder 62 is swung out of registry with the now-retracted lug 71 on the lockwasher 70. If desired, the circuit to the solenoid coil can now be opened as for example by permitting switch contact S1 (not illustrated) to drop into a notch in the inner end of the annular wall of the key shank 42. This deenergizes the solenoid coil 66, but since notch 76 is not in registry with locking lug 71, washer 70 is prevented from returning to its locking position until cylinder 62 is rotated back to the position shown in FIG. 8.

One of the advantages of the embodiment shown in FIGS. 8–10 is that it includes both an electronic and mechanical locking feature. Once the solenoid coil 66 has been energized to unlock the cylinder 62 relative to casing 64, the lock cylinder 62 can be rotated into any one of a number of different angular positions, at least to the extent permitted by slot 79. Likewise during this movement the pin 78 can be utilized to operate supplemental mechanical locking devices, or for that matter could be used also mechanically to trip additional control circuits. For example, while it would be possible to connect bulb B in parallel with coil 66 for simultaneous energization therewith, it would be possible instead to connect the bulb in circuit with a third switch S3 (FIG. 9) mounted on casing 64 for operation by pin 78. Key 60 would then be used first to energize the coil 66 to withdraw the locking washer 70 immediately upon insertion into the keyway. Then the key 60 could be rotated clockwise from its position in FIG. 9 far enough to cause pin 78 to engage and close switch S3, thus to energize the bulb B. This would permit the solenoid coil 66 immediately to be deenergized as soon as the key 60 is rotated out of its illustrated position, and before bulb B is energized for the purpose of triggering the associated control circuit. In such case, of course, the openings 45 in the key shank 42 would not register with the inner ends of the light pipes 25 until the key 60 had been rotated a predetermined angle out of the position as shown in FIGS. 8 to 10.

From the foregoing it will be apparent that the present invention provides a relatively simple and inexpensive means for providing a vast variety of differently coded keys and associated light pipes, merely by selectively locating the spaced openings 45 in the tubular shank of a key relative to the surrounding light pipes 25. Although for purposes of illustration the size of the light pipes 25 have been exaggerated in the drawings, in practice the diameter of each such pipe is miniscule relative to the mean diameter of the key shank 42, and to the length of the axail bore in the key shank. Thus thousands of different key codes could be made for even the smallest of keys.

In FIG. 1, for example, the designations $L_1$ through $L_6$ denote the various axial distances at which each of the six illustrated light pipes 25 is located from the beginning or the outer end of the tubular bore in key 40; and in FIGS. 2–5 the various angular dispositions of the second, third and fifth of the illustrated light pipes 25 relative to the first light pipe are denoted by the designation alpha with corresponding subscripts. It will thus be apparent that the number and disposition of the light pipes 25 is limited only to the number of such light pipes which can open on the inner peripheral surface area of the bore in tubular shank 42 of the associated key. Moreover, it will also be apparent to one skilled in the art that by making only slight increases in the diameter or axial length $L_n$ of the bore in the key shank, it will be possible to use an extremely large number of additional light pipes 25, if desired.

Still another advantage of this device is that it is a relatively simple matter to form the desired apertures 45 in the key shank 42; and the cooperating flats 22 and 43 assure the necessary registry of these apertures with the correct openings 24 in the surrounding key cylinder.

Moreover, as shown in FIGS. 8–10, it is a simple matter to supplement this device with additional mechanical and electrical features which will enhance its utility.

While the invention has been described only in connection with the energization of one set of the light-sensitive elements, it will be understood that other sets of light pipes and associated light sensitive elements would be employed in the same way to control respectively different locking devices. Moreover, it is to be understood that instead of a tubular shank 42, the key could have a solid, light-transmissive shank, in which case the outer peripheral surface of the shank could be coated or otherwise provided with an opaque cover except in those areas where the set of apertures 45 for a given key are to appear. Also, while the key shanks have been shown to be circular in cross section, it will be apparent that shanks of other cross sectional configurations could be employed (e.g., oval, hexogonal, octagonal, rectangular), provided they have cross sectional areas large enough to accommodate a large variety of coded light pipe locations.

Moreover, while this invention has been illustrated and described in detail in connection with only certain embodiments thereof, it will be apparent that it is capable of still further modification, and that this application is intended to covery any such modifications as may fall within the scope of one skilled in the art or the appended claims.

What I claim is:

1. An electronic locking device, comprising a housing having therein an elongate, generally cylindrical keyway, a locking circuit associated with said housing and including a plurality of light-sensitive elements disposed, when energized, to unlock an associated locking mechanism, a key having an elongate, generally cylindrically shaped, one-piece shank similar in configuration to said keyway, and having on its outer peripheral surface a chordal flat which extends substantially the full axial length of the shank, and said shank being releasably insertable into an operative position in said keyway substantially coaxially thereof, and with said flat engaging a corresponding flat formed on the inner peripheral surface of said keyway thereby to prevent relative rotation between said shank and said keyway, a first plurality of separate light pipes mounted in said housing with one end of each pipe registering with one of a like plurality of spaced openings formed in the wall of said keyway intermediate its ends, and with the opposite end of each pipe confronting on one of said light sensitive elements, said shank having a light transmissive central section extending continouusly for substantially the full axial length of said shank, and surrounded by an opaque section having therethrough a second plurality of radial openings which are fixed angularly and axially relative to the axis of said shank, and means operable upon the placement of said shank into its operative position in said keyway to direct light from a common source thereof longitudinally through said shank and radially through said second plurality of openings into said one ends of certain only of said light pipes, thereby to energize only those light-sensitive elements confronting on the opposite ends of said certain light pipes.

2. An electronic locking device as defined in claim 1, wherein said shank is generally tubular in configuration and has therein a longitudinally extending bore, and has an annular wall portion containing said second plurality of radial openings, each of which at one end opens on the bore in said shank and at its opposite end on the exterior of said shank to register with one of said openings in said wall of the keyway, when said key is in its operative position.

3. An electronic locking device as defined in claim 2, wherein, said light source comprises an electric lamp mounted adjacent one end of said shank to direct light longitudinally through the bore in said shank, and said means includes a switch operated in response to placement of said key in its operative position to connect said lamp to a power supply to be energized thereby.

4. An electronic locking device as defined in claim 1, including means mounting said housing for rotation by said key about the axis of said keyway, releasably locking means normally securing said housing against rotation, and electrically operated means operative upon insertion of said key into its operative position to release said locking means and to permit rotation of said housing.

5. An electronic locking device as defined in claim 4, wherein said light source is an electric lamp mounted adjacent one end of said shank to be energized when said key is in its operative position, said housing is mounted for limited rotation in opposite directions about said keyway axis, first switch means is mounted in said housing for operation by said key upon insertion thereof into its operative position, thereby to actuate said electrically operated means and to effect release of said locking means, and second switch means is mounted adjacent said housing for operation by said housing upon rotation thereof from one to the other of its limit positions, thereby to energize said lamp.

* * * * *